United States Patent
Ledingham et al.

(10) Patent No.: US 6,752,260 B2
(45) Date of Patent: Jun. 22, 2004

(54) GUIDE RAIL SUPPORT BRACKET FOR CONVEYOR SYSTEM

(75) Inventors: Stuart J. Ledingham, Coto de Caza, CA (US); David N. Padgett, Carlsbad, CA (US)

(73) Assignee: Valu Engineering, Inc., Rancho Santa Margarita, CA (US)

( * ) Notice: Subject to any disclaimer, the term of this patent is extended or adjusted under 35 U.S.C. 154(b) by 0 days.

(21) Appl. No.: 10/410,695

(22) Filed: Apr. 8, 2003

(65) Prior Publication Data

US 2003/0178540 A1 Sep. 25, 2003

Related U.S. Application Data

(63) Continuation of application No. 09/790,209, filed on Feb. 20, 2001, now Pat. No. 6,543,608, which is a continuation of application No. 09/407,146, filed on Sep. 28, 1999, now Pat. No. 6,189,685.

(51) Int. Cl.[7] .............................................. B65G 21/20
(52) U.S. Cl. ................................................... 198/836.3
(58) Field of Search ..................... 198/836.3; 248/230.1, 248/231.85, 295.11; 403/43, 48, 194

(56) References Cited

U.S. PATENT DOCUMENTS

| 4,225,035 A | 9/1980 | Mohney et al. |
| 4,502,594 A | 3/1985 | Sijbrandij |
| 5,335,782 A | 8/1994 | Herzog |
| 5,626,221 A | 5/1997 | Ledingham |
| 5,692,596 A | 12/1997 | Ledingham |
| 5,860,511 A | 1/1999 | Ensch et al. |
| 6,189,685 B1 | 2/2001 | Ledingham et al. |
| 6,543,608 B2 | 4/2003 | Ledingham et al. |

*Primary Examiner*—Joseph Valenza
(74) *Attorney, Agent, or Firm*—Knobbe, Martens, Olson & Bear LLP

(57) ABSTRACT

The present invention provides a guide rail support bracket assembly for supporting a conveyor system guide rail through a support rod. The assembly includes a support bracket having a mounting segment configured to be mounted to a conveyor body. The support bracket is preferably formed by cutting and bending a generally flat metal plate. A support segment is connected at one end to the mounting segment and at another end, spaced from the mounting segment, to an angled clamping section. The support rod is clamped into the clamping section by an eyebolt that fits through a clamping hole formed in the angled clamping section. The eyebolt is drawn into the angled clamping section by a clamping knob.

7 Claims, 6 Drawing Sheets

GUIDE RAIL SUPPORT BRACKET FOR CONVEYOR SYSTEM

CROSS REFERENCE TO RELATED APPLICATIONS

This application is a Continuation of U.S. patent application Ser. No. 09/790,209, filed Feb. 20, 2001, now U.S. Pat. No. 6,543,608 which is a continuation of U.S. patent application Ser. No. 09/407,146, filed Sep. 28, 1999, now U.S. Pat. No. 6,189,685. The entire contents of the above applications are incorporated herein by reference and made part of the present disclosure.

BACKGROUND OF THE INVENTION

1. Field of the Invention

This invention relates generally to assembly line and conveyor systems that provide the guided transport of objects down a predetermined path and, more particularly, the invention relates to a support bracket that secures guide rails in place on a conveyor system.

2. Description of the Related Art

Manufacturers commonly utilize conveyor systems in processing, packaging, and assembly lines in which a product travels on a track or belt and is transported through or between various manufacturing procedures. Guide rails are provided to maintain specific positioning of the product during a procedure, and/or to prevent lateral movement that may result in the product falling off the belt.

Guide rail support assemblies are utilized on each side of the conveyor belt structure to align one or more guide rails along the predetermined path. Usually, pairs of assemblies are located across from each other along the conveyor system. Typically, guide rail support brackets are attached to the sides of the conveyor structure, and support rods are mounted to the brackets.

Conventional guide rail support brackets are typically constructed of plastic. Conveyor systems, however, are typically cleaned on a regular basis with harsh chemicals that may wear away plastic parts and weaken plastic guide rail support brackets. Conventional guide rail support brackets typically include a body with a horizontally oriented, cylindrically shaped cavity in which the support rod is clamped. The cavity provides volumes, surfaces, and crevices that are difficult to clean and where cleaning chemicals may become trapped. The diameter of the cylindrically shaped cavity also limits the diameter of the support rods that can be used with the bracket.

SUMMARY OF THE INVENTION

The present invention provides a guide rail support bracket assembly for supporting a conveyor system guide rail through a support rod. The assembly includes a support bracket having a mounting segment configured to be mounted to a conveyor body. The support bracket is preferably formed by cutting and bending a generally flat metal plate. A support segment is connected at one end to the mounting segment and at another end, spaced from the mounting segment, to an angled clamping section. The support rod is clamped into the clamping section by an eyebolt that fits through a clamping hole formed in the angled clamping section. The eyebolt is drawn into the angled clamping section by a clamping knob or fastener.

The support bracket assembly of the present invention overcomes the limitations of the prior art in a number of ways. First, the support bracket is preferably constructed of stainless steel, which is not susceptible to deterioration from harsh cleaning chemicals. Second, the support bracket assembly has less internal or hard to access surface area in comparison to the prior art, which makes the bracket easy to clean and prevents the trapping of cleaning chemicals. Third, the support bracket does not have a cylindrical cavity that limits the maximum diameter of the support rod that would otherwise have to fit through the cavity. Fourth, the support bracket assembly can accommodate support rods of variable sizes by using an eyebolt with an appropriately sized eyelet. Furthermore, the support bracket has a simple construction that makes the bracket easy and inexpensive to fabricate.

In one aspect of the invention, a guide rail support bracket assembly for a conveyor system comprises: (1) a support bracket comprising: (a) a mounting segment; a support segment connected at one end to the mounting segment; and (b) an angled clamping section having a clamping hole formed therein, the angled clamping section being connected to the support segment at an end spaced from the mounting segment; (2) a threaded eyebolt ending in an eyelet, the eyebolt configured to fit through the clamping hole such that the eyelet is positioned on a concave side of the angled clamping section; and (3) a fastener configured to thread onto the eyebolt and pull the eyelet into the angled clamping section from an opposite side of the angled clamping section. In a preferred aspect of the invention, the bracket is formed by cutting and bending a generally flat metal plate.

In another aspect of the invention, a guide rail support bracket for a conveyor system comprises: (1) a mounting segment having at least one mounting hole formed therein, the mounting segment extending substantially along a first plane; (2) a support segment attached to the mounting segment along a length that extends substantially across the mounting segment, the support segment extending substantially along a second plane, the second plane being substantially perpendicular to the first plane, the support segment extending beyond the mounting segment; and (3) an angled clamping section configured to secure a guide rail support rod, the angled clamping section comprising: (a) a first clamping segment attached to the support segment beyond the mounting segment, the first clamping segment extending substantially along a third plane, the third plane being substantially perpendicular to the first plane, the first clamping segment being oriented at about a 45 degree angle relative to the support segment; and (b) a second clamping segment connected to the first clamping segment at a clamping joint, the second clamping segment extending along a fourth plane, the fourth plane being substantially perpendicular to the first plane, the second clamping segment being oriented between about 70 degrees and 110 degrees relative to the first clamping segment. In a preferred aspect of the invention, the angled clamping section has a clamping hole formed therethrough.

In still another aspect of the invention, a conveyor system guide rail support bracket assembly comprises: (1) a conveyor having a conveyor body; (2) a guide rail support bracket formed by cutting and bending a flat metal plate, the bracket comprising: (a) a mounting segment attached to the conveyor body; (b) a support segment connected at one end to the mounting segment; and (c) an angled clamping section connected to the support segment at an end spaced from the mounting segment; (3) a clamping mechanism; (4) a support rod clamped into the angled clamping section by the clamping mechanism; and (5) a guide rail attached to an end of the support rod.

DETAILED DESCRIPTION OF THE PREFERRED EMBODIMENT

In the following description, reference is made to the accompanying drawings, which form a part hereof, and which show, by way of illustration, specific embodiments in which the invention may be practiced. Other embodiments may be utilized and structural changes may be made without departing from the scope of the present invention. Numerous specific details are set forth in order to provide a thorough understanding of the present invention. However, it will be understood by one skilled in the art that the present invention may be practiced without the specific details or with certain alternative equivalent devices and methods to those described herein.

Figure 1A:
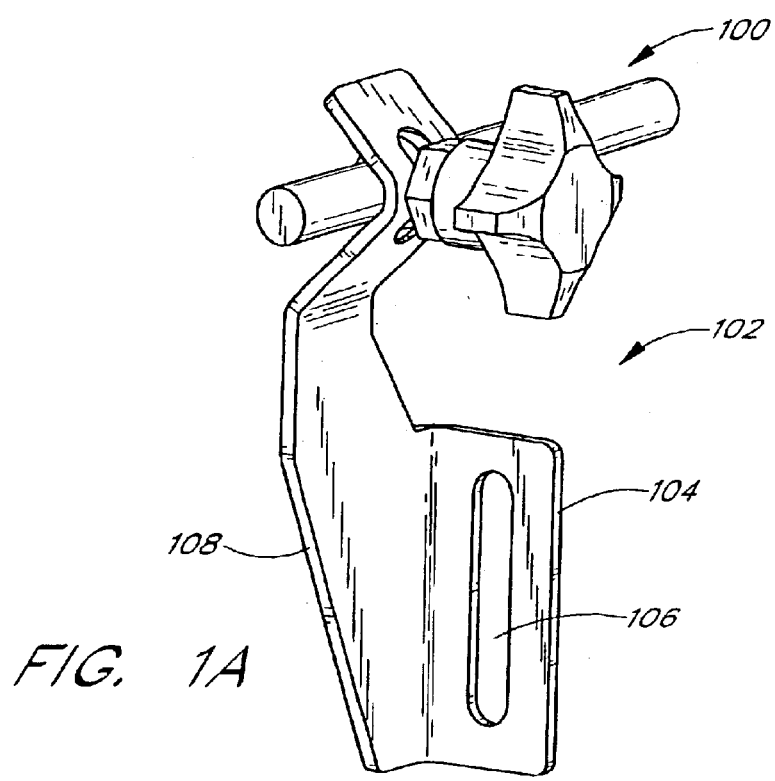
FIG. 1A illustrates a perspective view of a preferred embodiment of a guide rail support bracket assembly including a support bracket.
Figure 1B:
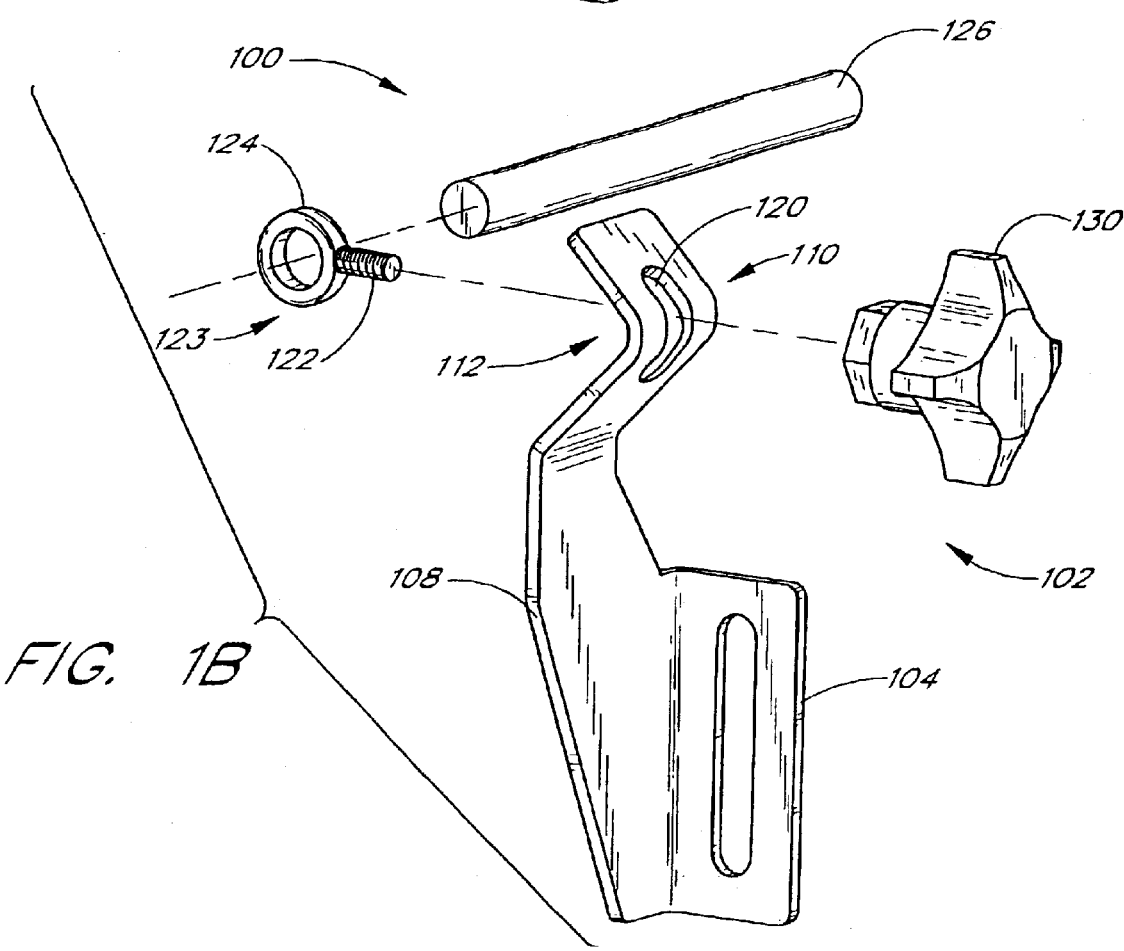
FIG. 1B illustrates an exploded perspective view of the assembly of FIG. 1A.

Referring to FIGS. 1A and 1B, a guide rail support bracket assembly 100 includes a guide rail support bracket 102, which, in its preferred form, is constructed from a one-piece member stamped or bent from a flat plate of stainless steel, carbon steel, or any suitable metal or alloy. A mounting segment 104 preferably extends in a vertical plane and has an elongated mounting hole 106 for mounting and adjusting the bracket 102. A vertically aligned support segment 108 is attached substantially along the edge of the mounting segment 104 such that the support segment 108 is substantially perpendicular to the mounting segment 104. The support segment 108 extends above the mounting segment 104 to form an angled clamping section 110. The clamping section 110 defines a concave recess 112 having a shallow "V" shape.

A guide rail support rod 126 is clamped into the clamping section 110 by a clamping mechanism. In the preferred embodiment, the clamping mechanism comprises an eyebolt 123, a threaded clamping knob (fastener) 130, and a clamping hole 120. The support rod 126 is inserted through an eyelet 124 positioned on the end of a threaded portion 122 of the eyebolt 123. The clamping hole 120 is formed in the clamping section 110 to allow the threaded portion 122 and the eyelet 124 of the eyebolt 123 to fit through the clamping section 110. The eyebolt 123 and eyelet 124 are drawn into the clamping section 110 by the threaded clamping knob 130 from a side of the clamping section 110 opposite the concave recess 112. After the support rod 126 is inserted through the eyelet 124 and the bolt 122 inserted through the clamping hole 120, the knob 130 is turned to draw the support rod 126 into the clamping section 110. As the clamping knob 130 is tightened, the support rod 126 becomes firmly clamped within the concave recess 112 of the clamping section 110.

In the preferred embodiment, the clamping hole 120 is elongated, has a height slightly greater than the outer diameter of the eyelet 124, and has a width slightly greater than the width of the threaded portion 122 or the eyelet 124, whichever is greater. The diameter of the eyelet 124 is preferably slightly larger than the diameter of the support rod 126. In addition, the height of the clamping hole 120 can be made large enough to accommodate eyelets 124 of varied diameters. Accordingly, support rods 126 having larger diameters can be used with the support bracket 102 by selecting an eyebolt 123 having an eyelet 124 with a large enough diameter to accommodate the support rod 126. Some eyebolts 123 with larger diameter eyelets 124 may also be able to be used with support rods 126 having smaller diameters.

In an alternative embodiment, the clamping mechanism can comprise a "U" bolt, two clamping knobs, and one or two clamping holes formed on opposite sides of the clamping section 110. The support rod 126 can be inserted into the "U" bolt, the "U" bolt can be inserted into the clamping holes, and the clamping knobs can be tightened to draw the support rod 126 into the clamping section 110. Other clamping mechanisms could also be used as will be recognized by one skilled in the art.

Figure 2A:
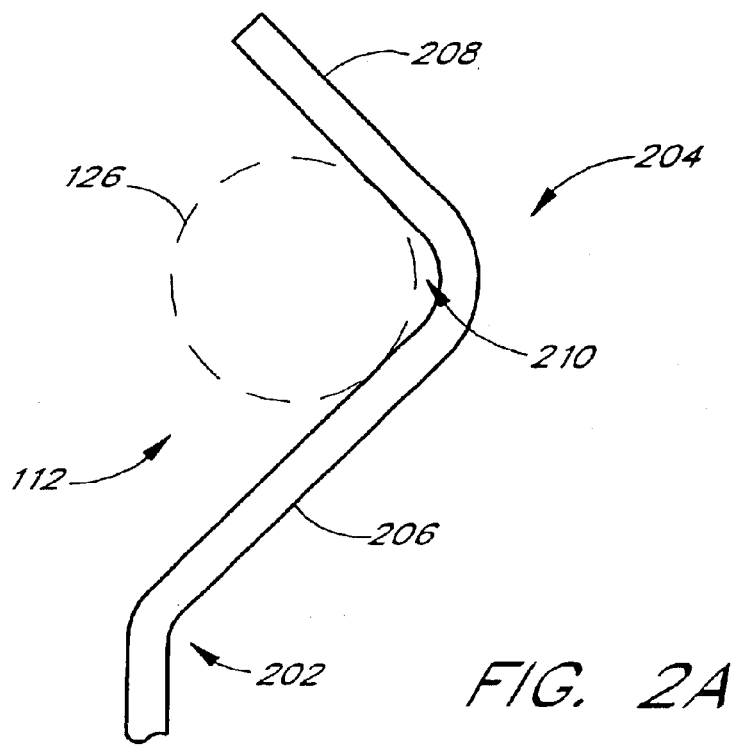
FIG. 2A illustrates a front elevational view of the clamping section of the support bracket of FIG. 1.

FIG. 2A illustrates a front elevational view of the clamping section 110 in accordance with a one embodiment of the invention. The clamping section 110 is preferably formed from a lower bend 202 of approximately 45 degrees from the support segment 108 in a first direction and an upper bend 204 of approximately 90 degrees in an opposite direction. The lower bend 202 and upper bend 204 define a lower clamping segment 206, an upper clamping segment 208, and the concave recess 112 of the clamping section 110. In the illustrated embodiment, the radius of the upper bend 204 is somewhat smaller than the radius of the support rod 126. A gap 209 is therefore left between the support rod 126 and the upper bend 204. In an alternative embodiment, the radius of the upper bend 204 can be configured to be substantially similar to the radius of the support rod 126, in which case there will be little or no gap 210.

Figure 2B:
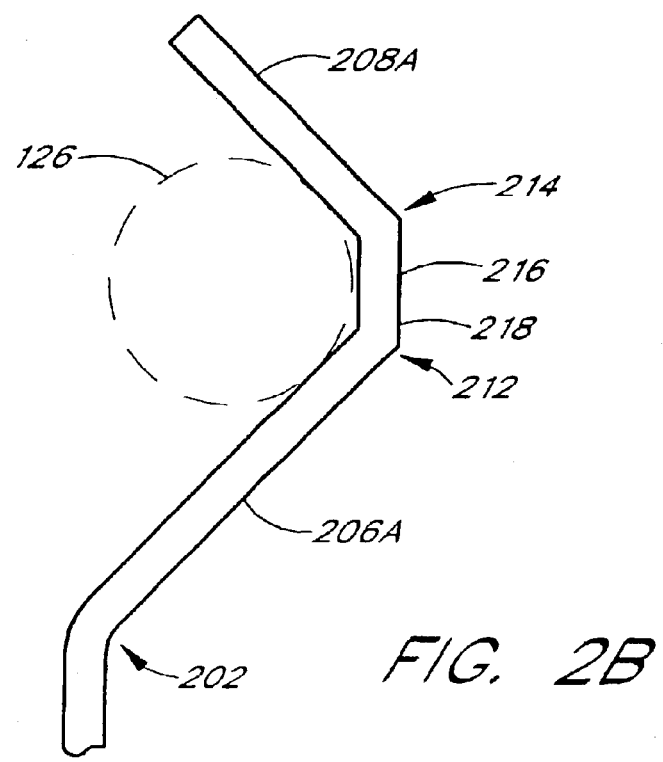
FIG. 2B illustrates a front elevational view of an alternative embodiment of the clamping section.

FIG. 2B illustrates a front elevational view of the clamping section 110 in accordance with an additional embodiment of the invention. In this embodiment, the upper bend 204 is replaced by a first upper bend 212 of about 45 degrees and a second upper bend 214 of about another 45 degrees. The first upper bend 212 and the second upper bend 214 define a straight connecting segment 216 that connects a lower clamping segment 206A to an upper clamping segment 208A. The lower clamping segment 206A and the upper clamping segment 208A are preferably oriented at approximately a 90 degree angle relative to each other. The connecting segment 216 preferably has a flat surface 218 on the exterior surface of the clamping section 110 upon which the clamping knob 130 can squarely rest.

Figure 3:
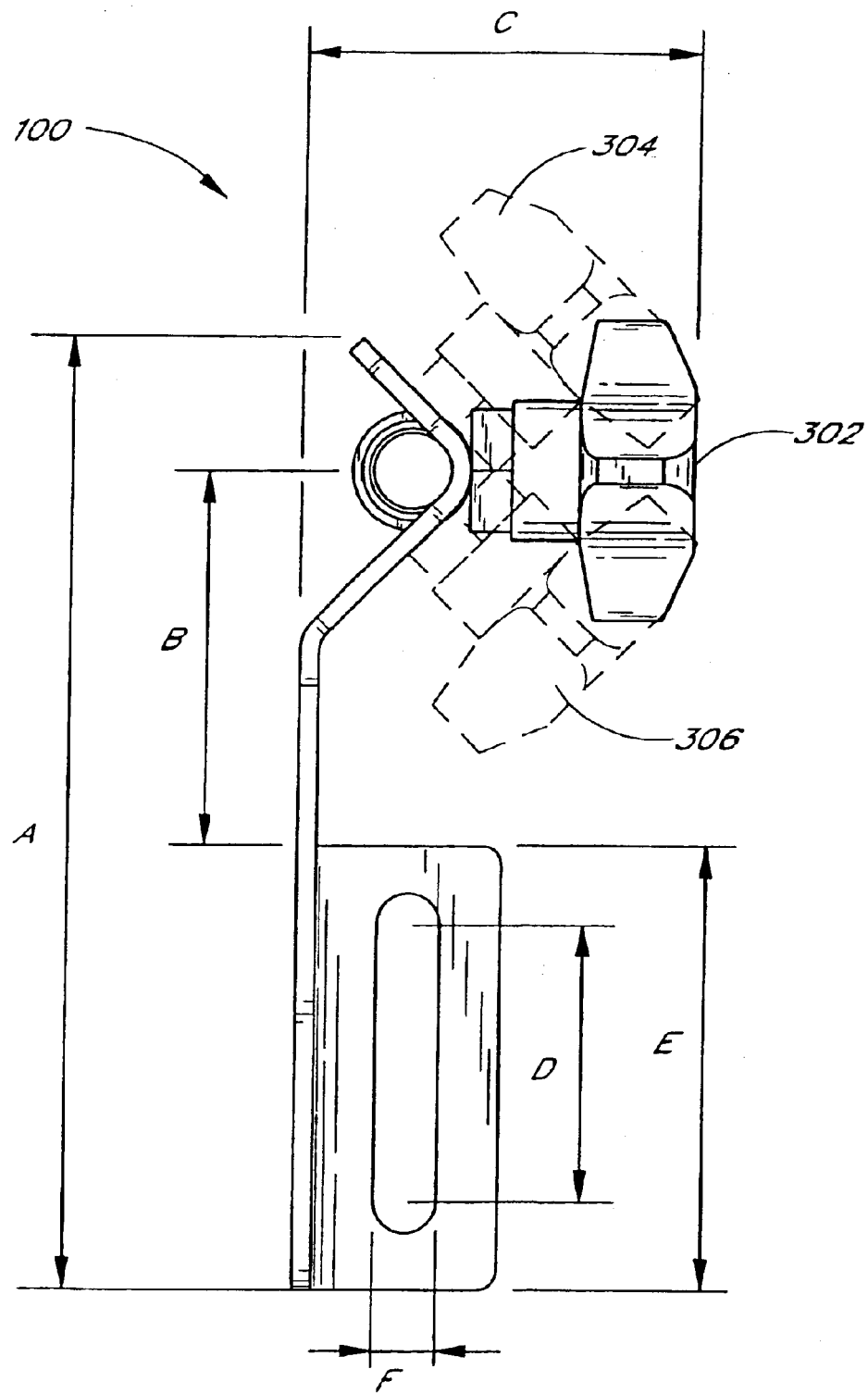
FIG. 3 illustrates a front elevational view of the assembly of FIG. 1 showing three possible positions of the clamping knob.

Referring to FIG. 3, the clamping knob 130 and eyebolt 123 can be placed in three different positions relative to the clamping section 110. In a first position 302, shown in solid line, the eyebolt 123 extends and the knob 130 rotates substantially along a horizontal axis. In a second position 304, shown in phantom, the knob 130 rotates substantially along an axis elevated at 45 degrees. In a third position 306, also shown in phantom, the knob 130 rotates substantially along an axis declined by 45 degrees. The knob 130 and eyebolt 123 can also be positioned at any location between the three positions 302, 304, and 306 if the clamping section 110 is configured in accordance with FIG. 2A and wherein the radius of the upper bend 204 is substantially similar to the radius of the support rod 126. The clamping knob 130 and eyebolt 123 can therefore be placed in various positions to accommodate the preference of the individual installing or adjusting the assembly 100. In addition, the configuration of any surrounding equipment may make some clamping positions preferable over others.

Figure 4:
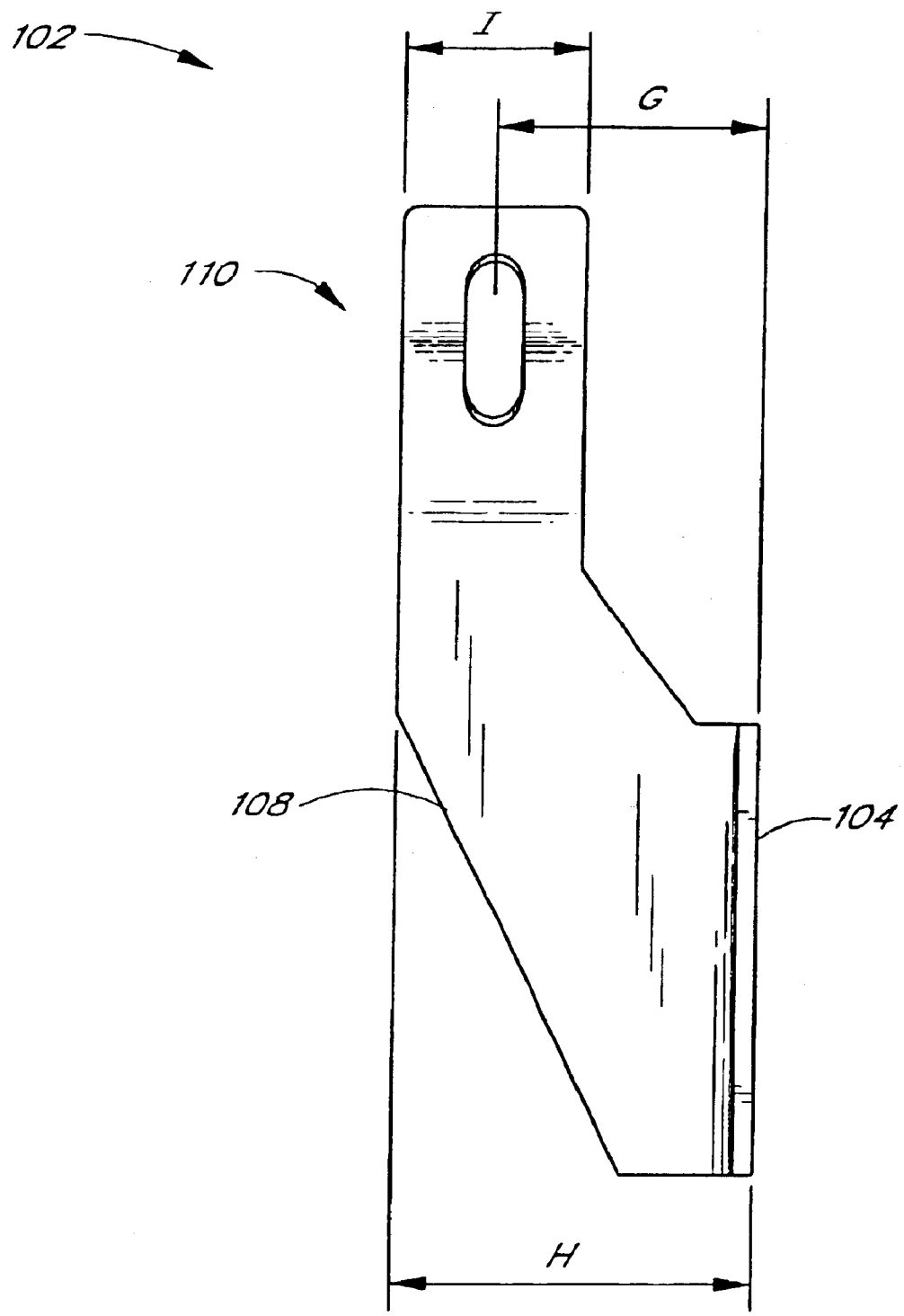
FIG. 4 illustrates a side elevational view of the assembly of FIG. 1.

FIGS. 3 and 4 indicate, through the corresponding letters listed below, the dimensions of a preferred embodiment of the assembly 100. The dimensions are approximately as follows:

A—6.33 inches
B—2.52 inches
C—2.60 inches
D—1.84 inches
E—2.94 inches
F—0.41 inches
G—1.77 inches
H—2.36 inches
I—1.20 inches Although the dimensions of the preferred embodiment are listed above, it will be noted that the dimensions of alternate embodiments can be adjusted accordingly to take into account the specific requirements of alternate applications.

The support bracket 102 is preferably formed from a single steel plate. The steel plate is first cut into a requisite shape and then appropriately bent to form the support bracket 102. Alternatively, each segment of the support bracket can be individually cut from steel plating and the support bracket can be formed by joining, preferably by welding, the individual segments together. The support bracket 102 is preferably formed from 11 gauge or 0.120 inch thick stainless steel.

Figure 5:
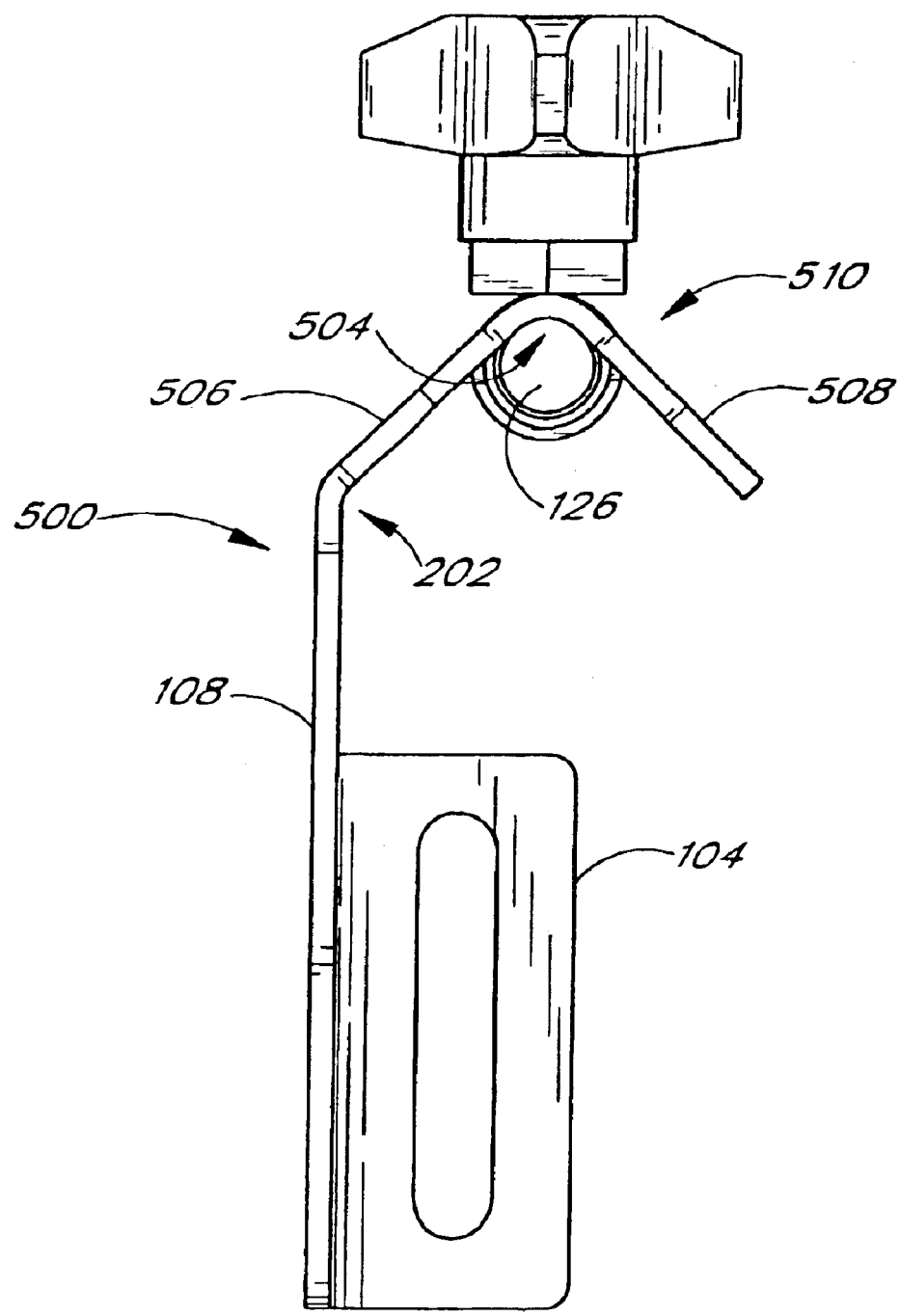
FIG. 5 illustrates a front elevational view of an alternative embodiment of the guide rail support bracket assembly.

FIG. 5 illustrates a front elevational view of an alternative embodiment of a guide rail support bracket assembly 500. In this embodiment, a clamping section 510 is oriented to clamp the support rod 126 from above rather than from the side. The mounting segment 104, the support segment 108, and the lower bend 202 are similar to or the same as those of the embodiment illustrated in FIGS. 1–4. An upper bend 504 of approximately 90 degrees, however, bends in the same direction as the lower bend 202. The lower bend 202 and upper bend 504 define a first clamping segment 506 and a second clamping segment 508.

Figure 6:
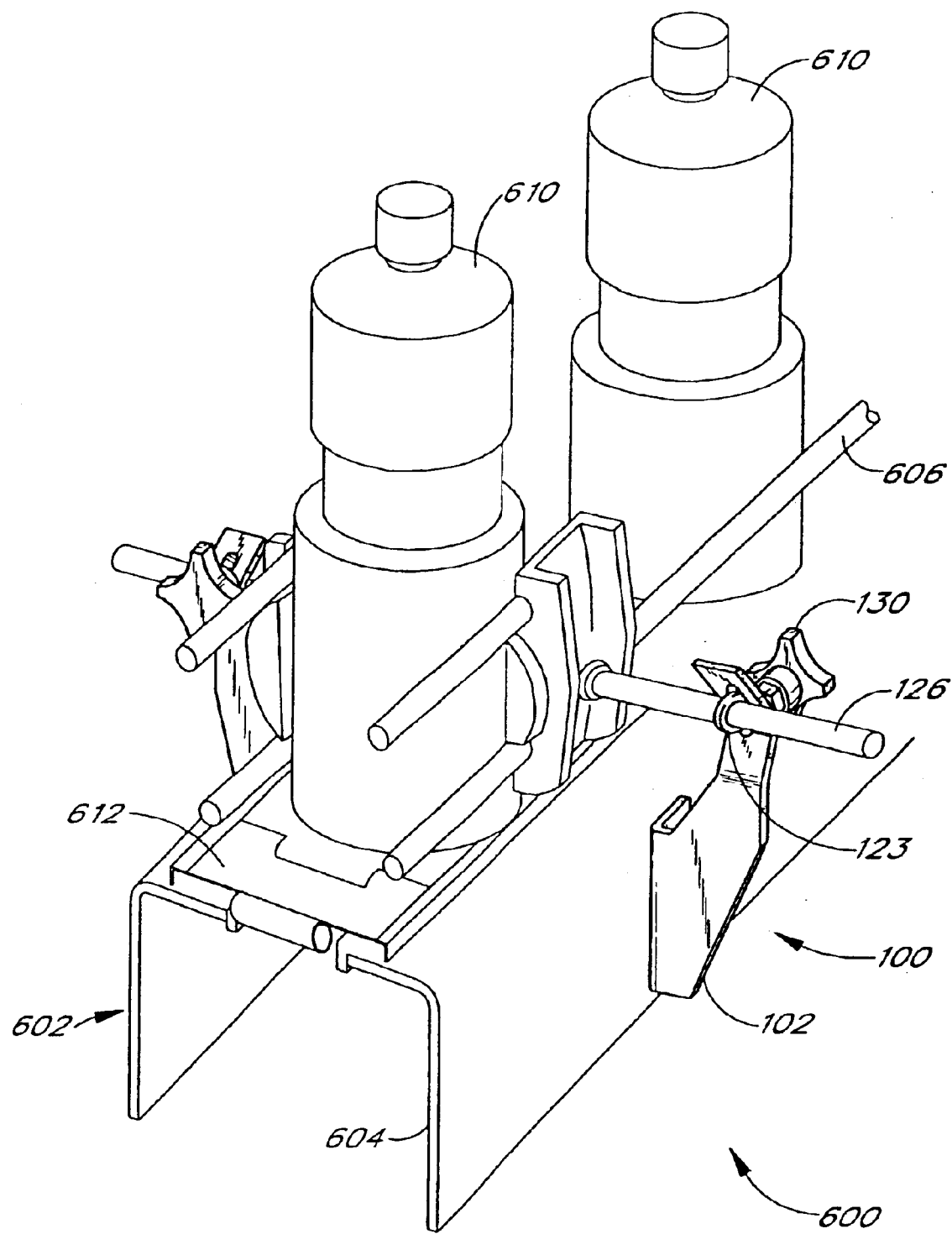
FIG. 6 illustrates the guide rail support bracket assembly in conjunction with a guide rail and a conveyor system.

FIG. 6 illustrates the guide rail support bracket assembly 100 in conjunction with a conveyor system 600. A conveyor 602 has a conveyor body 604 to which the support bracket 102 is mounted. The support bracket 102 can be mounted by one or more fasteners (not shown) through the elongated mounting hole 106 to the conveyor body 604. The elongated mounting hole 106 preferably allows the support bracket 102 to be vertically adjusted on the conveyor body 604. The support rod 126 is clamped into the clamping section 110 of the support bracket 102 by the eyebolt 123 and the clamping knob 130. A guide rail 606 is attached to the end of the support rod 126 and supported by the support rod 126. The guide rail 606 guides objects 610 along the conveyor belt 612.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed. It is intended that the scope of the invention be limited not by this detailed description but by the claims appended hereto.

What is claimed is:

1. A method of assembling a conveyor system, comprising:
   providing a guide rail support bracket having a mounting segment and a rod-clamping portion;
   attaching the guide rail support bracket to a conveyor assembly;
   providing a rod adapted to support a guide rail clamp;
   providing a clamping member adapted to clamp the rod to the rod-clamping portion of the guide rail support bracket;
   assembling said rod and said clamping member on said clamping portion of said guide rail support bracket; and
   rotating said clamping member to a desired position relative to said guide rail support bracket about a longitudinal axis of said rod.

2. The method of claim 1, wherein rotating said clamping member includes rotating said clamping member about said rod.

3. The method of claim 1, wherein said clamping member comprises a knob and an eyebolt.

4. The method of claim 3, wherein assembling said rod and said clamping member comprises inserting said eyebolt through an opening in said support bracket and inserting said rod through said eyebolt.

5. The method of claim 1, wherein the rod comprises a circular cross-section.

6. The method of claim 1, further comprising securing said clamping member at said desired position relative to said guide rail support bracket.

7. The method of claim 6, wherein securing said clamping member comprises tightening a knob on an eyebolt.

* * * * *